(12) United States Patent
Arneau et al.

(10) Patent No.: US 10,352,706 B2
(45) Date of Patent: Jul. 16, 2019

(54) DEVICE FOR DISPLAYING AND UPDATING AN AERIAL TRAJECTORY PATTERN ALIGNED WITH AN AREA ON THE GROUND, IN PARTICULAR FOR AN AIR-DROP MISSION

(71) Applicant: THALES, Courbevoie (FR)

(72) Inventors: David Arneau, Pessac (FR); Guillaume Dupont, Pessac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/529,476

(22) PCT Filed: Dec. 2, 2015

(86) PCT No.: PCT/EP2015/078287
§ 371 (c)(1),
(2) Date: May 24, 2017

(87) PCT Pub. No.: WO2016/096415
PCT Pub. Date: Jun. 23, 2016

(65) Prior Publication Data
US 2017/0276486 A1   Sep. 28, 2017

(30) Foreign Application Priority Data

Dec. 15, 2014   (FR) ..................................... 14 02850

(51) Int. Cl.
*G08G 5/00* (2006.01)
*G01C 21/20* (2006.01)
*G01C 23/00* (2006.01)

(52) U.S. Cl.
CPC ............. *G01C 21/20* (2013.01); *G01C 23/00* (2013.01); *G08G 5/006* (2013.01); *G08G 5/0021* (2013.01); *G08G 5/0034* (2013.01); *G08G 5/0039* (2013.01); *G08G 5/0091* (2013.01)

(58) Field of Classification Search
CPC .......... G01C 21/20; G01C 23/00; G08G 5/00; G08G 5/0021; G08G 5/0034; G08G 5/0039; G08G 5/006; G08G 5/0091
USPC ........................................................... 701/3
See application file for complete search history.

(56) References Cited

U.S. PATENT DOCUMENTS

| 8,924,044 | B1 * | 12/2014 | Wang | G05D 1/0022 340/961 |
| 9,118,771 | B2 * | 8/2015 | Rodriguez | G01C 21/20 |
| 9,881,507 | B2 * | 1/2018 | Rencher | G08G 5/0091 |
| 2009/0140887 | A1 * | 6/2009 | Breed | G01C 21/165 340/990 |

(Continued)

*Primary Examiner* — Atul Trivedi
(74) *Attorney, Agent, or Firm* — Baker & Hostetler LLP (57) ABSTRACT

A pattern able to be updated by an operator, the position, the orientation and/or the shape of the trajectory pattern dependent on trajectory parameters, the device comprises at least display means to view the trajectory pattern and the representation of the zone, and means for computing and storing the position data of the pattern and of the representation, the representation comprising a set of control points, the function of a control point being to define at least the value of one of the trajectory parameters, the value being dependent on the movement of the control point, a trajectory pattern modification resulting from an interaction of the operator moving at least one control point.

17 Claims, 13 Drawing Sheets

(56) References Cited

U.S. PATENT DOCUMENTS

| | | | |
|---|---|---|---|
| 2009/0152391 A1* | 6/2009 | McWhirk | B64B 1/02 244/30 |
| 2010/0252648 A1* | 10/2010 | Robinson | A01G 15/00 239/14.1 |
| 2011/0199239 A1 | 8/2011 | Lutz et al. | |
| 2012/0175427 A1* | 7/2012 | Feldman | A01G 15/00 239/2.1 |
| 2012/0191332 A1* | 7/2012 | Sawhill | G08G 5/0013 701/120 |
| 2013/0345905 A1 | 12/2013 | Parthasarathy | |
| 2014/0024999 A1* | 1/2014 | Levien | G05D 1/00 604/66 |
| 2014/0032105 A1 | 1/2014 | Kolbe et al. | |
| 2014/0039731 A1 | 2/2014 | Leberquer et al. | |
| 2014/0114506 A1* | 4/2014 | Puyou | G08G 5/025 701/18 |
| 2014/0117674 A1* | 5/2014 | Phillips | F03B 13/16 290/53 |
| 2014/0201126 A1* | 7/2014 | Zadeh | G06K 9/627 706/52 |
| 2014/0240147 A1* | 8/2014 | Goda | B64D 1/16 340/945 |
| 2014/0316692 A1* | 10/2014 | Hillger | G01C 21/20 701/409 |
| 2014/0324253 A1* | 10/2014 | Duggan | G05D 1/0061 701/3 |
| 2014/0365041 A1 | 12/2014 | Deker et al. | |
| 2015/0339930 A1* | 11/2015 | McCann | G08G 5/0039 701/528 |
| 2016/0216130 A1* | 7/2016 | Abramson | G01C 21/3626 |
| 2016/0252071 A1* | 9/2016 | Phillips | F03B 13/20 290/50 |
| 2018/0012502 A1* | 1/2018 | Savarit | G01C 23/00 |
| 2018/0105284 A1* | 4/2018 | B. | B64D 43/00 |

\* cited by examiner

DEVICE FOR DISPLAYING AND UPDATING AN AERIAL TRAJECTORY PATTERN ALIGNED WITH AN AREA ON THE GROUND, IN PARTICULAR FOR AN AIR-DROP MISSION

CROSS-REFERENCE TO RELATED APPLICATIONS

This application is a National Stage of International patent application PCT/EP2015/078287, filed on Dec. 2, 2015, which claims priority to foreign French patent application No. FR 1402850, filed on Dec. 15, 2014, the disclosures of which are incorporated by reference in their entirety.

FIELD OF THE INVENTION

The present invention relates to a device for displaying and updating patterns of aerial trajectories aligned with a zone on the ground, in particular for air-drop missions. The invention lies in the technical field of avionics missions. It relates more particularly to the carrying out of ground related missions, for example air-drop missions, also called "Aerial Delivery" missions, from an aircraft.

BACKGROUND

An air-drop mission can apply to:
personnel (parachutists);
materiel, for example food, tents, vehicles, or weapons.

The air-drop zone, also called the "Drop Zone", is a rectangular zone in which the materiel or the personnel must fall. It is defined by an entry point, an exit point, a width and an altitude.

To accomplish the air-drop in a planned zone, the aircraft follows a standardized flight pattern, called the air-drop pattern.

The air-drop pattern is the known flight trajectory labeled by points named AP, CARP, EOD, EORP and the REDO trajectory which are defined hereinafter:
  AP: "Alignment Point"—lateral alignment of the aircraft, this point allowing people in cargo bays to prepare the materiel to be air-dropped by leveling off the aircraft between this point and the following point CARP;
  CARP: "Calculated Air Release Point"—air-drop, the start of air-drop starting at this point, also called the "green light";
  EOD: "End Of Drop Pattern"—end of air-drop, the end of air-drop taking place at this point also called the "red light";
  EORP: "End Of Run Point", the aircraft remaining level between the points EOD and EORP so that people in the cargo bay have time to close the cargo bay and secure any remaining materiel;
  REDO: being the trajectory that the aircraft must follow in order to return to the point CARP if it did not have time to air-drop everything when it arrived at the point EOD.

Figure 1:
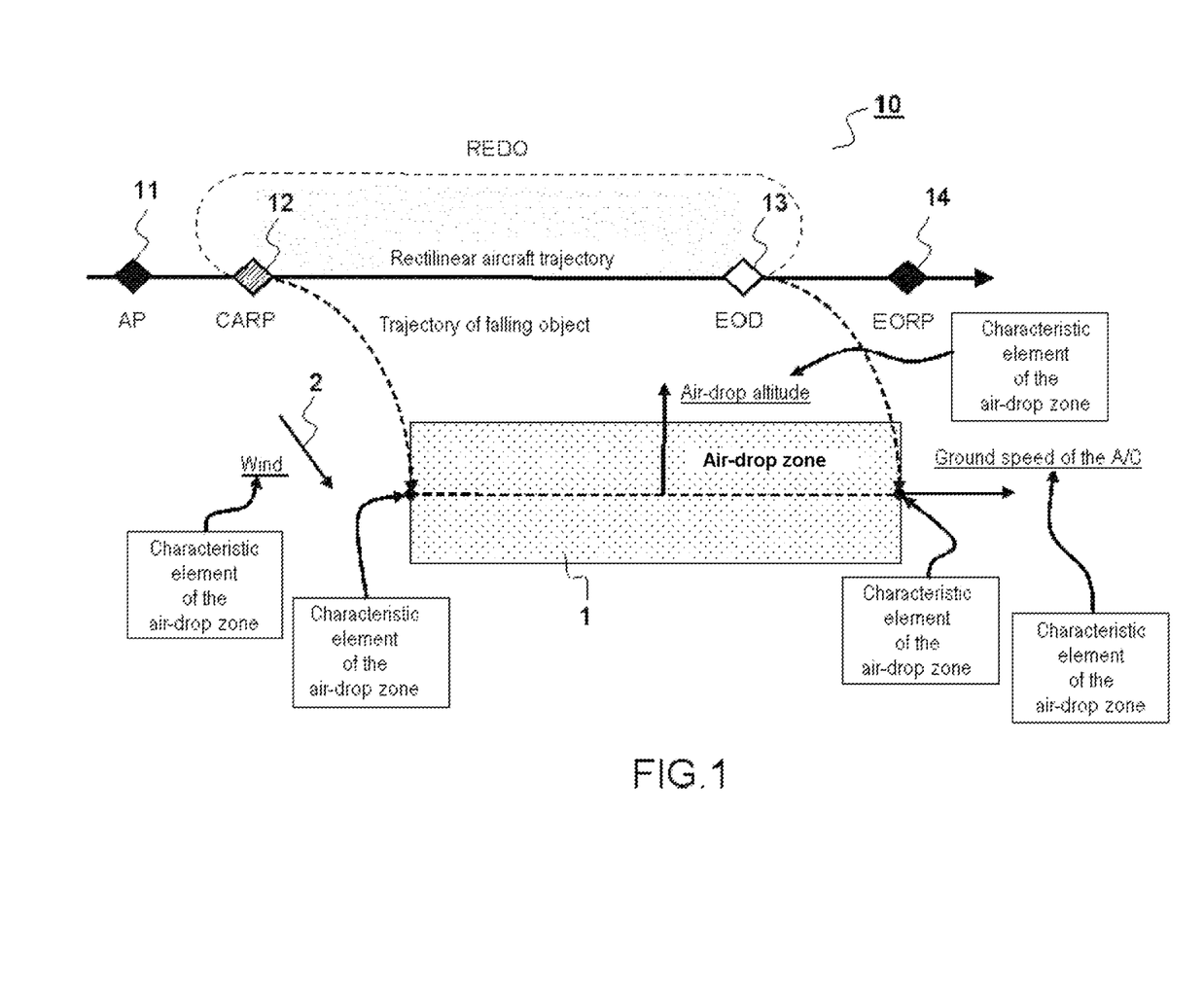
FIG. 1, an illustration of an air-drop trajectory pattern aligned with the representation of an air-drop zone.

FIG. 1 illustrates these points and this trajectory 10 by a view from above, aligned with the air-drop zone 1. These points are determined taking the environmental and mechanical constraints into account. These constraints are in particular the speed and the direction of the aircraft, the speed and the orientation of the wind, the altitude, the type of parachutes, the mass to be air-dropped, the type of air-drop, in particular depending on whether it involves personnel or materiel. The wind considered is a mean wind which takes account of the real gradient, the characteristics of the wind 2 being provided for a weather system.

It is the flight mission system (FMS) which determines the points AP, CARP, EOD, EORP and the REDO trajectory as a function of the parameters of the air-drop zone and of the above constraints, the parameters of the zone being in particular the entry point, the exit point, the width and the altitude of the air-drop. These parameters as well as the environmental and mechanical constraints are determined manually by the pilot and input manually by the pilot into the FMS.

A predefinition of the flight trajectory is performed in the main before the mission and then an adjustment is often made in flight, either according to the flight conditions, or on recognition of the zone, or identification or search on the ground. An automatic input and computation means is in this context necessary in order to reduce the operator's burden. Indeed, the existing solutions exhibit the following drawbacks:
  In recent avionics suites possessing the air-drop function, the air-drop patterns form an integral part of the FMS, all the parameters being input manually by the pilot;
  A lack of real-time graphical representativity, the operator inputting the technical values and thereafter obtaining a graphical representation of his pattern, that he can then correlate with his flight plan, or a charting background, confirming that the parameters are correct. In case of error, the operator must re-open the man-machine interface panel, modify the parameters and validate the pattern again on the flight plan or the chart, this process possibly being repeated several times, thus increasing the pilot's cognitive burden;
  A loss of time for the pilot who should concentrate on flight management rather than on the correct fulfillment of his mission;
  Moreover, this type of pattern is present only on certain recent flight computers, not being available in older avionics suites. It is therefore sought to afford a solution allowing the "retrofitting" of the former avionics suites by the addition of new functionalities independent of the avionics system and based in particular on onboard touchscreen tablets.

To summarize, the following are current problems:
  The number of parameters involved in the computation of the pattern is significant;
  In the case of an FMS, the parameters are currently input manually by the pilot. Should the pattern be modified, in terms of orientation or position, or should there be a change of environmental parameter, for example the weather, the pilot must rapidly modify his flight pattern, the manual inputting of the parameters increasing the pilot's cognitive burden;
  If this function is not available in an FMS, the pilot must evaluate these parameters manually on paper.

SUMMARY OF THE INVENTION

An aim of the invention is in particular to alleviate the aforementioned drawbacks so as to simplify the task of the navigation operator who must compute and position the air-drop pattern, serving for the computation of the trajectory of the aircraft. For this purpose, the subject of the invention is a device for viewing and updating an aerial trajectory pattern aligned with the representation of a zone on the ground, said pattern being able to be updated by an operator, the position, the orientation and/or the shape of said trajectory pattern being dependent on trajectory parameters, said device comprising at least display means for viewing said pattern and said representation of the zone, and means for computing and storing the position data of said pattern and of said representation, said representation comprising a set of control points, the function of a control point being to define at least the value of one of said trajectory parameters, said value being dependent on the movement of said control point, a trajectory pattern modification resulting from an interaction of the operator moving at least one control point.

One of said parameters being dependent on the position, the orientation and/or on the shape of said zone, a first control point is for example linked with said zone, the movement of said control point giving rise to the translation of said zone according to said movement. A second control point is for example linked with said zone, the movement of said control point making it possible to modify the length and the orientation of said zone.

The amplitude and the direction of the wind forming one of said parameters, the amplitude of the movement of a control point defines for example the amplitude of the wind, the direction of movement of said point defining the direction of the wind.

The speed of an aircraft following said trajectory being one of said parameters, the amplitude of the movement of a control point defines for example the speed, the direction of movement of said point defining the direction of movement of said aircraft.

The altitude of said zone being one of said parameters, the amplitude of a control point defines for example the amplitude of said zone.

In a particular embodiment:
  the computation and storage means comprise at least one data module able to store and compute said position data and said control points;
  the display means comprise at least one screen and a charting engine detecting the interactions of the operator on the screen and controlling the display of said pattern and of said representation with its control points, on the basis of the position computations provided by the data module.

The computation and storage means comprise for example a utility module whose function is to provide the data module with primitives of spherical geometry trigonometric computations for the computation of said positions.

Said device comprises for example a management module whose function is to interpret the operator interactions detected by the charting engine and to request the modifications of said representation from the data module when an interaction commands the movement of a control point, an updating of said pattern displayed on the screen being performed by an interaction of the operator controlling the movement of at least one control point, the charting engine providing the management module with the new position of said control point, the data module computing the new positions of said pattern as a function of the new values of said trajectory parameters resulting from the movement of said control point.

Said device comprises for example a database of maps containing digitized maps representing a geographical zone comprising said representation of the zone, said pattern being superposed on a geographical zone.

Said zone is for example an air-drop zone, said trajectory being an air-drop trajectory. The position, the orientation and/or the shape of said trajectory pattern being defined by a set of characteristic points, the position of said points is for example determined by said trajectory parameters. A characteristic point being an air-drop start point and another characteristic point being an air-drop end point, said points are for example able to be modified by said operator. The real aerial trajectory is for example superposed on said air-drop trajectory.

The display means comprise for example an interactive screen, the screen being able to be touch-sensitive. It takes the form for example of a tablet.

In a possible embodiment, the computation and storage means are installed in an onboard computer.

BRIEF DESCRIPTION OF THE DRAWINGS

Other characteristics and advantages of the invention will become apparent with the aid of the description which follows given in conjunction with appended drawings which represent.

DETAILED DESCRIPTION

Figure 2:
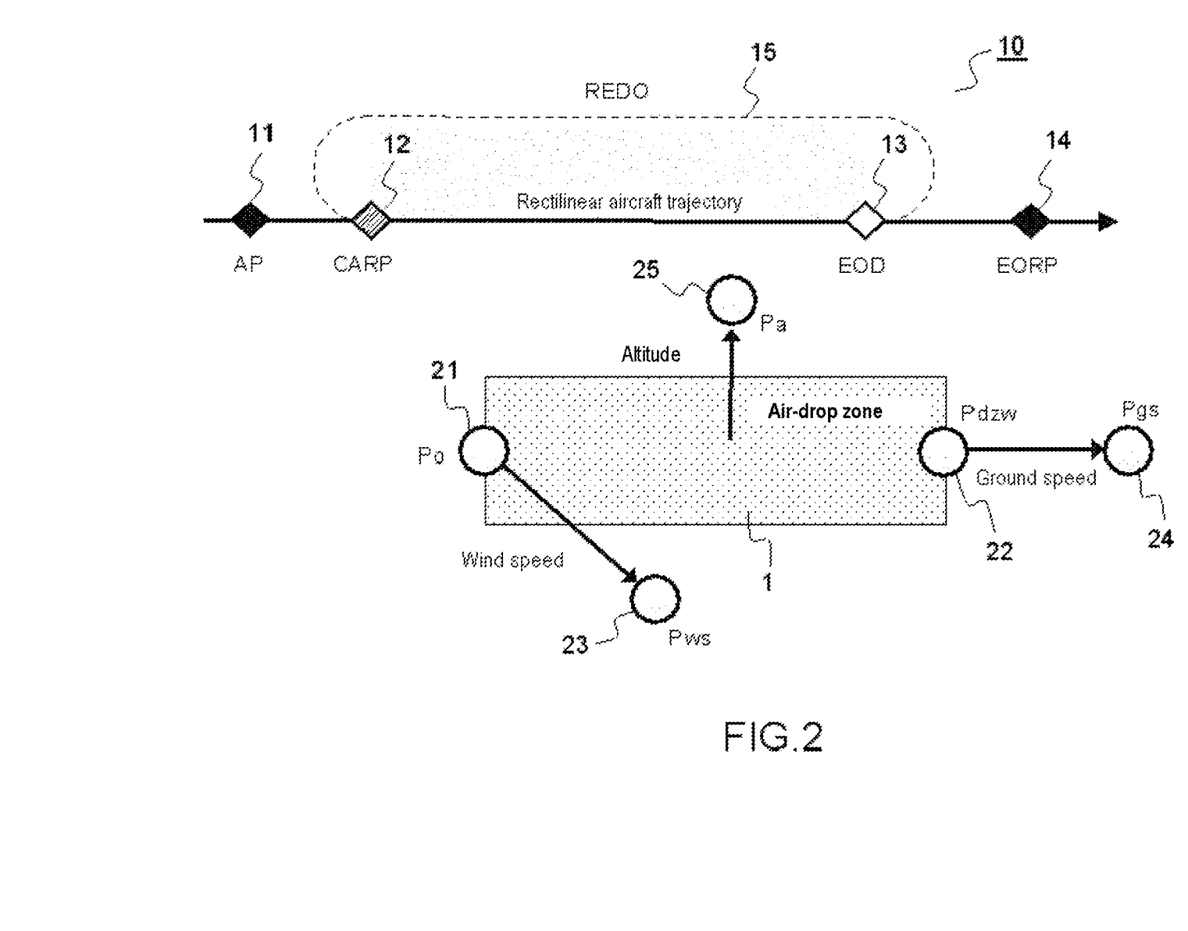
FIG. 2, an illustration of the principle of the invention, with the display of control points.

FIG. 2 illustrates the principle of the invention. The display device presents the air-drop zone 1 and the trajectory 10 already illustrated by FIG. 1. This trajectory 10, forming the air-drop pattern, comprises the characteristic points 11, 12, 13, 14 described previously, aligned, and the looped trajectory 15, termed REDO, this trajectory 15 looping back between the point EOD and the point CARP. According to the invention, use is made of a set of control points characteristic of the air-drop zone, where the movement of at least one control point modifies the parameters of the air-drop pattern 10, in particular the relative position of the air-drop pattern with respect to the air-drop zone 1. The parameters of the air-drop pattern 10 are in particular the positions of the characteristic points 11, 12, 13, 14.

Figure 3:
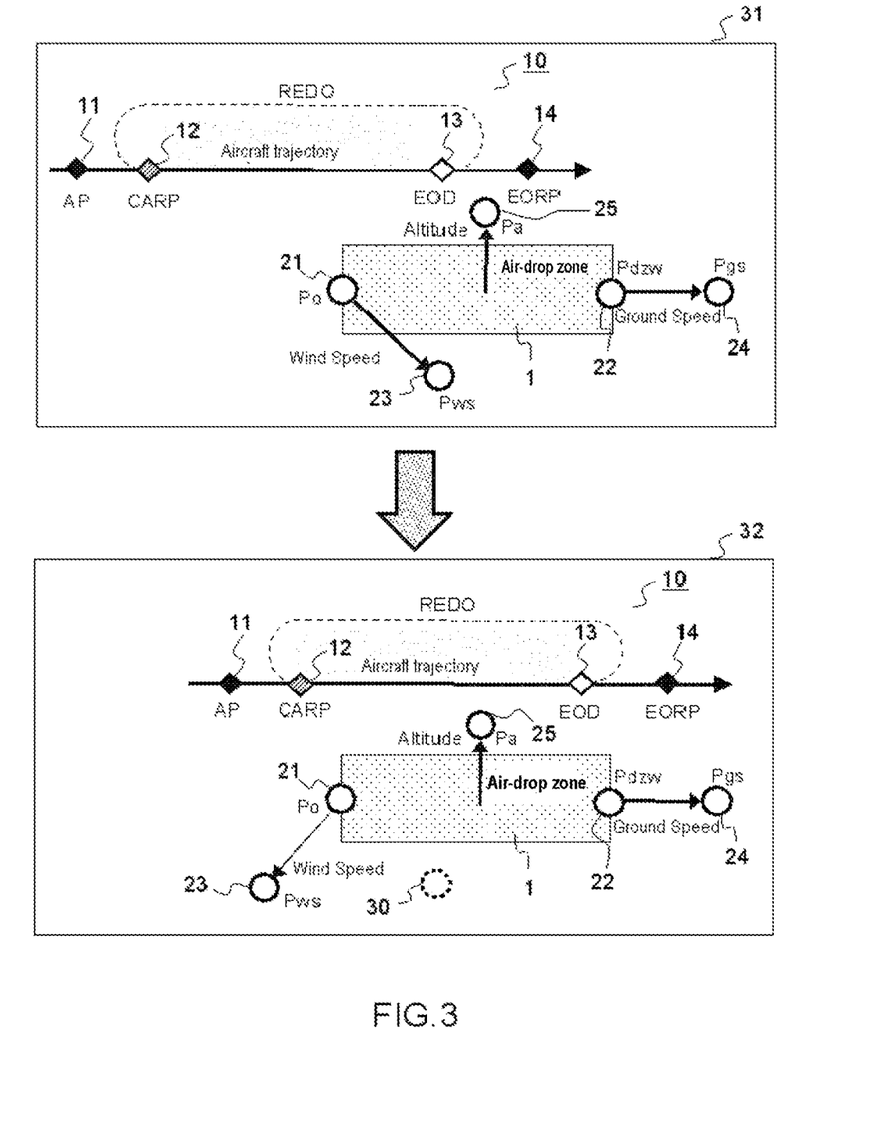
FIG. 3, an example of the manner of operation of a device according to the invention.

FIG. 3 illustrates the function of the control points by an exemplary movement of a control point. A first configuration 31 of the air-drop trajectory 10 and the air-drop zone 1 is displayed by the device. As a consequence of a movement of a control point 23 a second configuration 32 is obtained where the air-drop pattern 10 is shifted to the right with respect to the air-drop zone 1.

In this example the control point 23 used, denoted Pws, is a control point which makes it possible to modify the speed of the wind and its orientation. This speed is defined with respect to another control point 21, taken as the origin point of the air-drop zone 1, and denoted Po. The speed of the wind is defined by the distance between the points Pws and Po. The orientation of the wind is defined by the orientation of the point Pws with respect to the point Po.

To show the change of orientation and of speed of the wind, the point Pws is moved from the point 30, the position of the first configuration 31, to a new position. The air-drop pattern is moved to take account of this change of orientation and of speed of the wind.

In practice, the operations performed are for example the following:

An operator inputs the mission zone, or air-drop zone 1, on a charting system by activating a point of the chart via for example a graphical interface;

The device according to the invention dispatches a request to the flight management system (FMS) for it to compute the characteristic points with the current data of the selected air-drop zone;

The device displays a first trajectory with the characteristic points, for example AP, CARP, EOD, EORP, the REDO loop and the air-drop zone 1, the device also displays the control points;

The operator adjusts the configuration, and in particular the position and the shape of the air-drop pattern 10, by moving the control points on the graphical interface, several solutions being possible to bring about this movement. Any means of interaction can be devised to manipulate the control points on a display screen. These control points can for example be steered by finger on an interactive screen, a touchscreen tablet for example. It is in particular possible to use a technique of the "drag and drop" type. It is also possible to manipulate the control points on the basis of a designation pointer, a mouse for example, on any other non-interactive screen;

The new positions of control points are taken into account by the device which requests the FMS to compute accordingly the new position of the characteristic points, for example of the points AP, CARP, EOD, EORP;

The new air-drop trajectory is displayed.

The invention therefore uses control points whose function is to modify, through their movement, the position and the orientation of the pattern of the air-drop trajectory, or indeed its shape. The movement of some of these points also gives rise to modifications of position, orientation or shape of the zone on the ground. These control points are for example the following:

A point 21, denoted Po and already cited, defined as being the origin point of the air-drop zone 1. This point Po makes it possible to move the air-drop zone, without changing the other parameters, according to a translation defined by the movement of the point Po. The point Po is for example situated on one side of the air-drop zone, for example at the level of the entry of the zone. It can be situated at any location linked with the zone provided that its movement gives rise to the movement of the zone according to its movement;

A point 22, denoted Pdzw, making it possible to modify through its movement the length of the air-drop zone and its orientation with respect to a given azimuthal direction. The point Pdzw is for example situated on the side of the zone 1 opposite to the side containing the point Po, at the exit of the zone. It can be situated in any other location linked with the zone;

A point 23, denoted Pws and already cited, making it possible to modify through its movement the speed of the wind and its orientation which will be taken into account for the computations of the parameters of the air-drop pattern. The movement of the point Pws, in terms of amplitude and orientation, is measured with respect to the point Po or to any other reference point of the zone;

A point 24, denoted Pgs, making it possible through its movement to modify the aircraft speed taken into account in the computations of the parameters, the aircraft's speed variation being for example dependent on the movement of the point Pgs. The movement of the point Pgs, in terms of amplitude and orientation, is for example measured or defined with respect to the point Pdzw or to any other reference point of the zone;

A point 25, denoted Pa, making it possible through its movement to modify the air-drop altitude of the aircraft, therefore of the trajectory, the altitude variation being dependent on the movement of the point Pa. The amplitude of the movement of the point Pa is for example measured or defined with respect to a reference position.

Provision may also be made for the addition of a control point making it possible to modify the width of the air-drop zone.

When a control point is moved, the modified value appears for example on top of the point so that the operator has an exact estimation of this value, this or these value(s) being for example the speed and the orientation of the wind or the speed of the aircraft.

The control points hereinabove generate modifications of position and/or of orientation of the air-drop zone, as well as of shape. They also generate modifications of the environment conditions to be taken into account for the air-drop of the elements, in particular the speed and the direction of the wind, the speed of the aircraft or the altitude of the zone. The display and the updating of the air-drop pattern is dependent on the variations of the air-drop parameters. These air-drop parameters are in particular the position, the orientation or the shape of the air-drop zone, and/or variations of the environment conditions, these variations being characterized by the movements of the control points. Once the configuration of the zone and of the environment conditions, characterized by the new positions of the control points, are known, the position and the orientation of the air-drop pattern are computed in a manner known to the person skilled in the art, the computation pertaining to the characteristic points of the pattern. For example, it is known to situate the air-drop trajectory with respect to the air-drop zone, as a function of the wind, of the aircraft speed, or of the altitude and of the position/shape of the zone.

Figure 4:
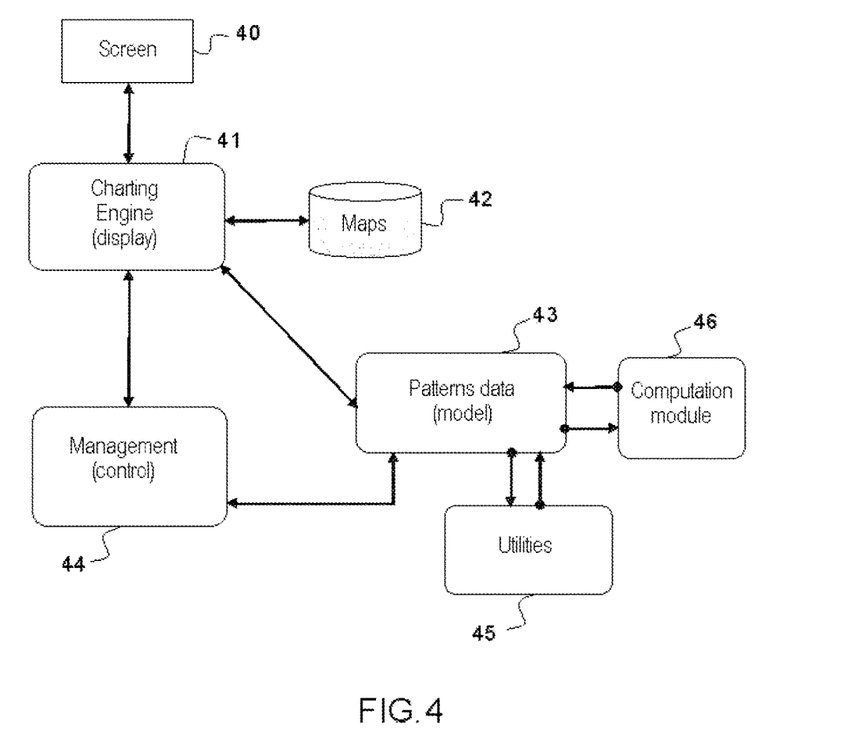
FIG. 4, a possible software architecture for the implementation of a device according to the invention.

FIG. 4 presents an exemplary software architecture implemented in a device according to the invention, as well as a screen 40 for displaying the pattern of the air-drop trajectory and the representation of the air-drop zone. It comprises in particular:

A charting engine module 41 tasked with displaying the graphic corresponding to the trajectory pattern 10 and to the air-drop zone 1, with displaying the charting background and the interactions with the user, for example the management of the "drag and drop" or the management of the mouse clicks;

A database of maps 42, containing at least the digitized map or maps of the sites where the air-drop zones are situated, as well as geographical data and aeronautical data. This database is accessed by the graphical engine which performs the display of the data and maps stored in this database. In another possible embodiment, this database 42 can be outside the device, the digitized maps being able to be downloaded for example;

A data module 43, able to store and to update all the data relating to the air-drop patterns and to the air-drop zones. In particular, this module 43 is able to store and to update the characteristic points AP, CARP, EOD, EORP and the REDO trajectory. The module also comprises the environmental and air-drop zone parameters, in particular the following:

The speed of the wind;

The speed of the carrier;

The position of the air-drop zone;
The size of the air-drop zone;
The orientation of the air-drop zone.

A management module 44 whose function is to recover the interactions of a user or of an operator, to interpret them and to request the updating of the data relating to the patterns and to the air-drop zones from the data module 43;

A utility module 45 whose function is to provide spherical geometry trigonometric computation primitives, so as to allow the computation of the position of all the points of a pattern in a, plane, geographical reference frame on the basis of the knowledge of the technical parameters of a pattern. These computation primitives are provided to the patterns data module 43 which integrates the module for computing the positions of points of the patterns.

A computation module 46 in charge of ballistic computations according to the various forms of the state of the art. The data module 43 being interfaced with this computation module 44, the data dispatched by the data module are in particular the parameters of the air-drop zone and the computed characteristics of the air-drop pattern AP, CARP, EOD, EORP, REDO.

An example of a manner of operation is described according to the following steps:

A user asks to display an air-drop pattern on the chart, for example by clicking on a scroll-down choice to select the air-drop pattern, and then by clicking on the location of the chart where the pattern must be displayed. The charting engine 41 determines the real geographical coordinates of the point designated by the user;

The various corresponding interactions are dispatched by the charting engine 41 to the management module 44, in particular the pattern to be displayed and its position (longitude, latitude). The management module 44 asks the data module 43 to initialize the pattern with the "ladder, longitude, latitude" data, passed as parameters;

The data module 43 updates the data and asks the charting engine 41 to display the pattern by call to primitives and lists of points;

The charting engine 41 displays the graphic corresponding to the computed pattern and to the computed air-drop zone;

The user performs for example a "drag and drop" of the control point Po which is the origin of the zone of the air-drop zone, the pattern having to be translated. The charting engine 41 interacts with the user and recovers the new point Po;

The various corresponding interactions are dispatched by the charting engine 41 to the management module 44, in particular the new position of the point Po of the air-drop zone (longitude, latitude). The management module 44 then asks the data module 43 to modify the pattern with the new point Po passed as "longitude, latitude" parameter;

The data module 43:
  Computes the new points forming the air-drop zone, possibly aided by the utility module 45 for the trigonometric computations, it updates the data of the pattern;
  Dispatches to the computation module 46 the new characteristics of the air-drop zone: speed of the wind, speed of the carrier, position of the air-drop zone, size of the air-drop zone, orientation of the air-drop zone, in return the computation module 46 computes the points AR, CARP, EOD, EORP, the REDO trajectory and dispatches them to the data module 43;
  Asks the charting engine to display the pattern by call to primitive and to a new list of points;

The charting engine displays the modified air-drop pattern as well as the modified air-drop zone.

The figures which follow illustrate several examples of using the control points on the screen of a device according to the invention. More particularly, these figures illustrate the manner of operation of the various control points for an air-drop pattern 10.

Figure 5:
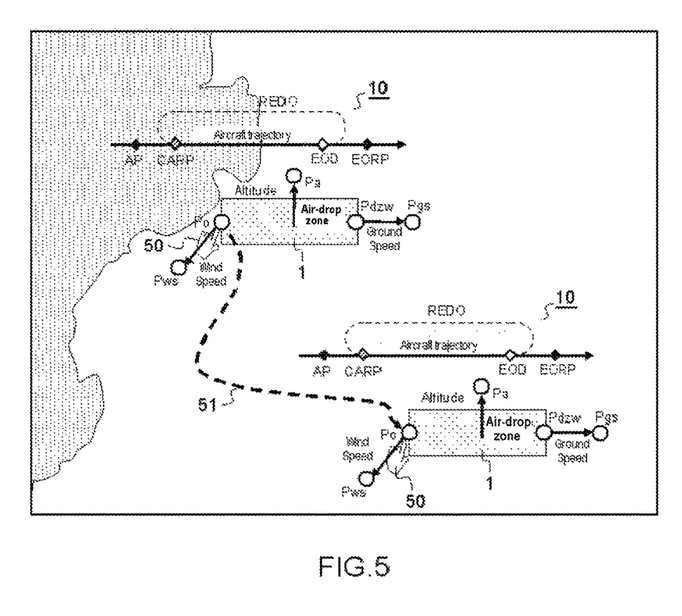
FIG. 5, FIGS. 6a and 6b, FIGS. 7a and 7b, FIGS. 8a and 8b, and FIGS. 9a and 9b, examples of using a device according to the invention.

FIG. 5 illustrates a first case where the origin point Po of the air-drop zone 1 is moved. More particularly, FIG. 5 presents a case of "drag and drop" performed by a finger 50 along a path 51 guiding the movement of the control point Po. The air-drop pattern 10 is translated according to the movement of the point Po.

Figure 6A:
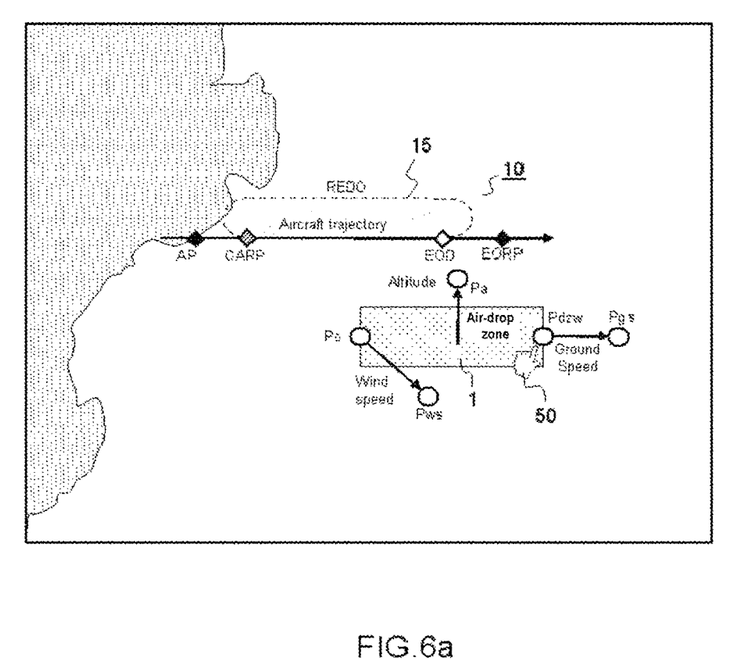
Figure 6B:
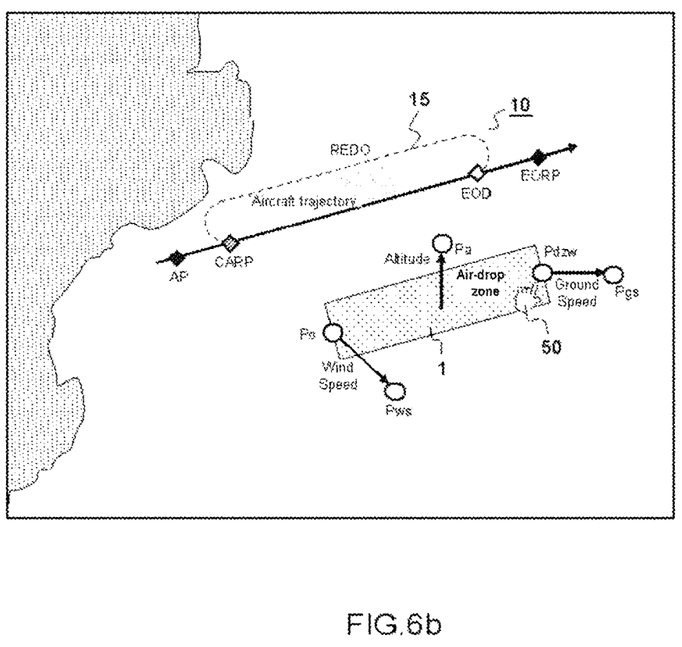

FIGS. 6a and 6b illustrate a second case where the control point Pdzw is moved. The origin point Po remaining fixed, this point is moved to the right and upward bringing about a lengthening and a rotation of the air-drop zone 1. All the points of the air-drop pattern and in particular the characteristic points are moved by the same motion bringing about the rotation of the pattern and the lengthening of the REDO loop 15.

Figure 7A:
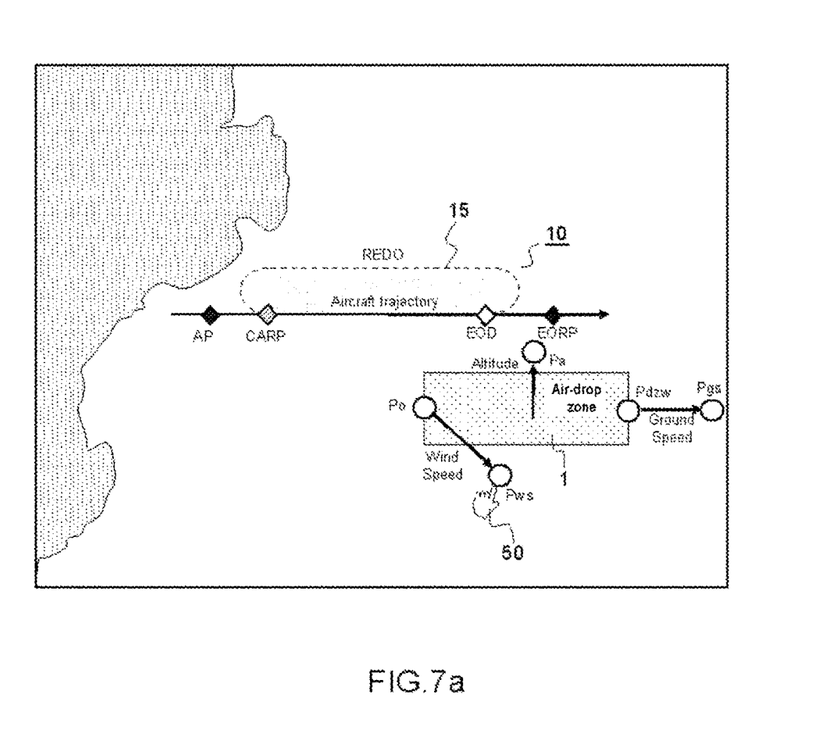
Figure 7B:
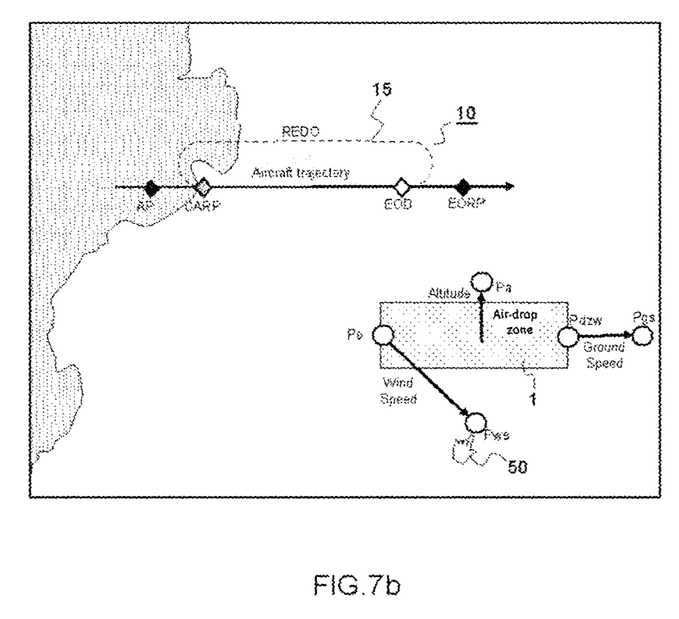

FIGS. 7a and 7b illustrate a third case where the wind speed is modified. The modification of the wind speed is performed by moving the control point Pws with respect to the origin point Po, its orientation remaining unchanged. The variation of the wind speed between FIG. 7a and FIG. 7b corresponds to an increase in the wind speed through an increase in the distance between the point Pws and the point Po. The stronger the wind, the further the trajectory of the aircraft strays from the air-drop zone. On the representation the air-drop pattern 10 therefore strays from the air-drop zone 1.

Figure 8A:
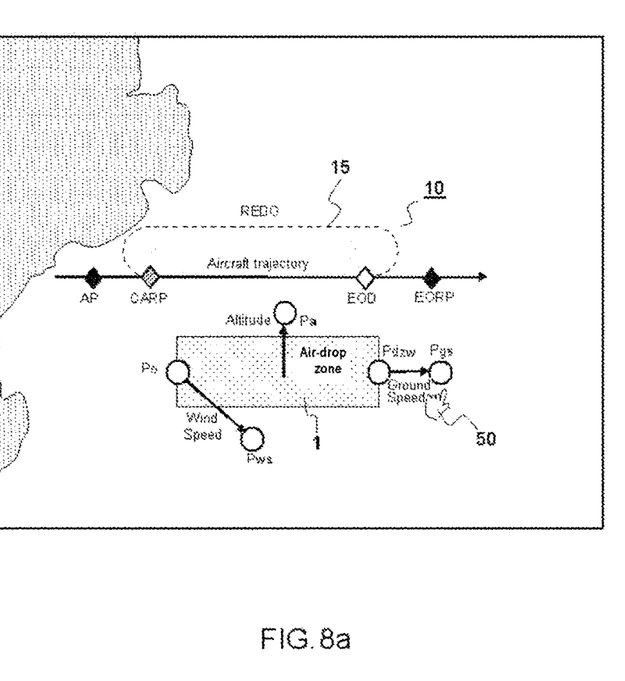
Figure 8B:
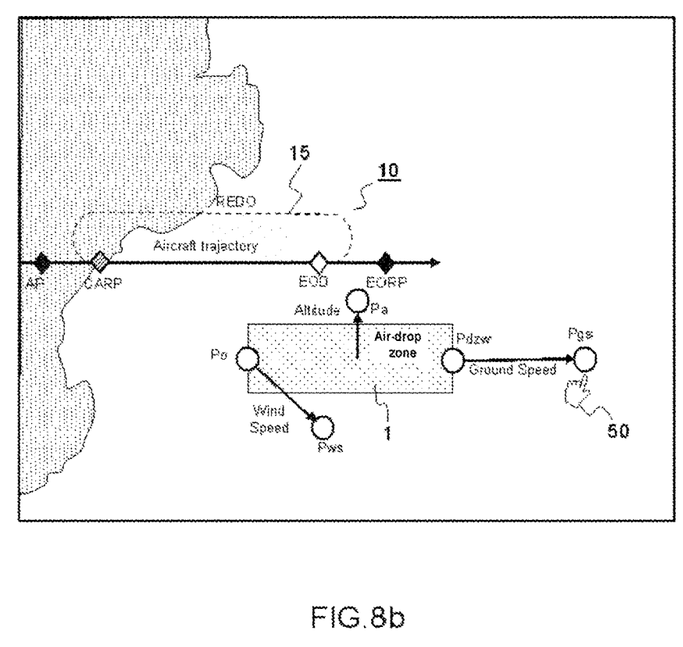

FIGS. 8a and 8b illustrate a fourth case where the speed of the aircraft with respect to the ground is modified. The modification of the speed of the aircraft is performed by moving the control point Pgs with respect to the origin point Po, its orientation remaining unchanged. The variation of the speed of the aircraft between FIG. 8a and FIG. 8b corresponds to an increase in the speed through an increase in the distance between the point Pgs and the point Pdzw. The higher the speed, the further the trajectory of the aircraft strays from the air-drop zone, in the opposite direction from the movement of the aircraft. On the representation the air-drop pattern 10 therefore likewise strays from the air-drop zone 1.

Figure 9A:
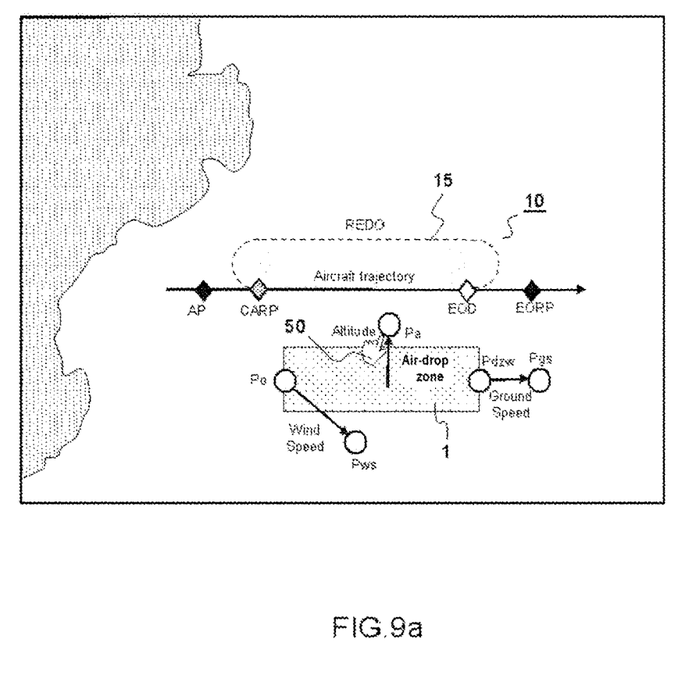
Figure 9B:
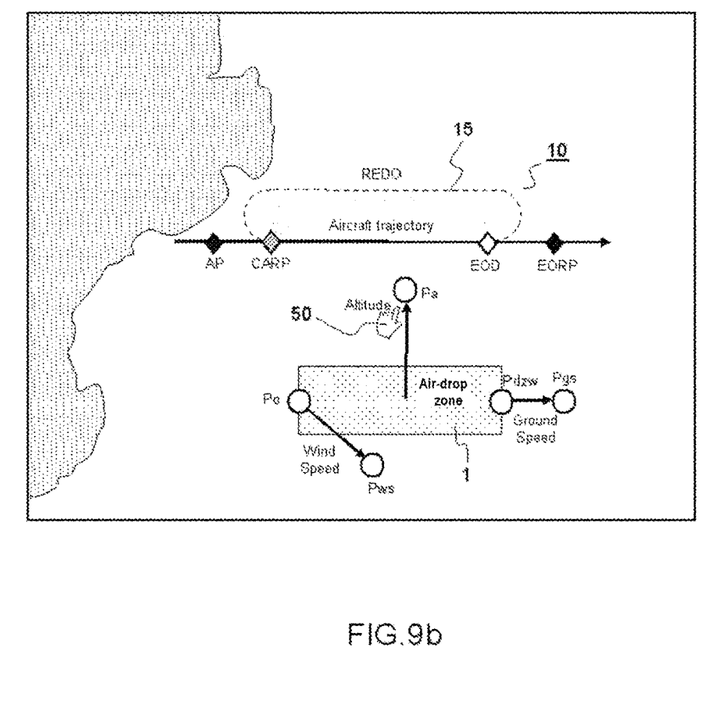

FIGS. 9a and 9b illustrate a fifth case where the altitude of the air-drop zone 1 is modified. The variation of altitude of the zone 1 is performed by moving the control point Pa. The variation of altitude of the zone between FIG. 9a and FIG. 9b corresponds to an increase in the altitude. The higher the speed, the further the aircraft's trajectory described by the pattern 10 strays from the air-drop zone, in the opposite direction from the movement of the aircraft.

The invention advantageously makes it possible to modify the air-drop parameters by interacting directly on the graphical representation of the air-drop pattern. The modification of a parameter for example by a "drag and drop" gives rise to an immediate computation of the air-drop pattern and its real-time graphical updating. The ergonomics of use is improved with respect to conventional interfaces, the latter bringing up a dialog box with a list of technical parameters in the form of numbers, and then subsequently the modification of the graphic of the pattern once the dialog box has closed.

In an advantageous embodiment, the invention can be implemented on a touchscreen tablet EFB, the air-drop pattern being able to be drawn on top of a charting background to improve the perception of the terrain which will receive the air-dropped elements. The tablet may be embedded on board in the cockpit of a transport aircraft or in a helicopter. The invention can advantageously be deployed on a tablet EFB within the framework of a cockpit retrofit to add a functionality to an avionics suite which does not have this function.

In another embodiment, the function implemented by the invention may be embedded in a mission computer with a graphical representation performed on a viewing unit of the interactive screen type already present in the cockpit.

Advantageously, the device according to the invention can also allow the operator to change the points CARP and EOD. The points P0 and Pdzw will then follow the changes of CARP and EOD.

The invention has been described for an air-drop mission, but it can apply in respect of the displaying and updating of an aerial trajectory aligned with a zone on the ground, the trajectory having to be positioned with respect to this zone.

Advantageously, the real trajectory of the aircraft can be superposed and the trace of the air-drop uncertainty width represented on the ground follows the same aforementioned assumptions. This allows the pilot to verify that the ground impact of the air-drop is in the zone.

The invention claimed is:

1. A device for viewing and updating an air-drop trajectory pattern aligned with a representation of an air-drop zone on the ground, said pattern being able to be updated by an operator, at least one of a position, an orientation and a shape of said air-drop trajectory pattern being dependent on trajectory parameters, the device comprising:
   a display that is configured to display said pattern and said representation of the air-drop zone; and
   a computer configured to compute and store the position data of said air-drop trajectory pattern and of said representation of the air-drop zone, wherein
   said representation of the air-drop zone comprising a set of control points that define at least a value of one of said trajectory parameters, and
   said value being dependent on a movement of said control point, an air-drop trajectory pattern modification resulting from an interaction of the operator moving at least one control point.

2. The device as claimed in claim 1, wherein one of said parameters being dependent on the at least one of the position, the orientation, and on the shape of said air-drop zone, a first control point is linked with said air-drop zone, the movement of said control point giving rise to the translation of said air-drop zone according to said movement.

3. The device as claimed in claim 2, wherein a second control point is linked with said air-drop zone, the movement of said control point making it possible to modify the length and the orientation of said air-drop zone.

4. The device as claimed in claim 1, wherein an amplitude and a direction of the wind forming one of said parameters, an amplitude of the movement of a control point defines the amplitude of the wind, a direction of the movement of said point defining the direction of the wind.

5. The device as claimed in claim 1, wherein a speed of an aircraft following said trajectory being one of said parameters, an amplitude of the movement of a control point defines the speed, a direction of movement of said point defining a direction of movement of said aircraft.

6. The device as claimed in claim 1, wherein an altitude of said air-drop zone being one of said parameters, an amplitude of a control point defines an amplitude of said zone.

7. The device as claimed in claim 1, wherein:
   the computer comprises at least one data module able to store and compute said position data and said control points; and
   the display comprises at least one screen and a charting engine detecting the interactions of the operator on the screen and controlling the display of said pattern and of said representation of the air-drop zone with its control points, on the basis of the position computations provided by the data module.

8. The device as claimed in claim 7, wherein the computer comprises a utility module whose function is to provide the data module with primitives of spherical geometry trigonometric computations for the computation of said positions.

9. The device as claimed in claim 7, comprising a management module whose function is to interpret the operator interactions detected by the charting engine and to request the modifications of said representation from the data module when an interaction commands the movement of a control point, an updating of said pattern displayed on the screen being performed by an interaction of the operator controlling the movement of at least one control point, the charting engine providing the management module with the new position of said control point, the data module computing the new positions of said pattern as a function of the new values of said trajectory parameters resulting from the movement of said control point.

10. The device as claimed in claim 1, comprising a database of maps containing digitized maps representing a geographical zone comprising said representation of the air-drop zone, said pattern being superposed on a geographical zone.

11. The device as claimed in claim 1, wherein the at least one of the position, the orientation, and the shape of said trajectory pattern being defined by a set of characteristic points, the position of said points is determined by said trajectory parameters.

12. The device as claimed in claim 11, wherein a characteristic point being an air-drop start point and another characteristic point being an air-drop end point, said points are able to be modified by said operator.

13. The device as claimed in claim 1, wherein the real aerial trajectory is superposed on said air-drop trajectory.

14. The device as claimed in claim 1, wherein the display comprises an interactive screen.

15. The device as claimed in claim 14, wherein the screen is touch-sensitive.

16. The device as claimed in claim 15, wherein the screen takes the form of a tablet.

17. The device as claimed in claim 1, wherein the computer is an installed onboard computer.

* * * * *